May 19, 1953  O. G. LANDSVERK  2,639,389
POCKET IONIZATION CHAMBER

Filed Dec. 22, 1949   3 Sheets-Sheet 1

INVENTOR.
OLE G. LANDSVERK
BY Zugelter & Zugelter
Attys.

May 19, 1953      O. G. LANDSVERK      2,639,389
POCKET IONIZATION CHAMBER

Filed Dec. 22, 1949      3 Sheets-Sheet 2

INVENTOR.
OLE G. LANDSVERK
BY
Zugelter & Zugelter
Attys.

May 19, 1953     O. G. LANDSVERK     2,639,389
POCKET IONIZATION CHAMBER

Filed Dec. 22, 1949     3 Sheets-Sheet 3

INVENTOR.
OLE G. LANDSVERK
BY Zugelter & Zugelter
Attys.

Patented May 19, 1953

2,639,389

UNITED STATES PATENT OFFICE 2,639,389

POCKET IONIZATION CHAMBER

Ole G. Landsverk, Mount Healthy, Ohio

Application December 22, 1949, Serial No. 134,385

16 Claims. (Cl. 250—83.3)

This invention relates to pocket chambers of the type that are worn by workers who may be exposed to gamma and X-ray radiation for the purpose of determining the total quantity of radiation to which the wearer of the pocket chamber has been exposed in a given period of time, say, an eight hour work shift, or a twenty-four hour period, or in any given unit of time.

In the art to which this invention pertains, the term "pocket chamber" signifies a device which may be worn on the person, as in one's pocket, or shirt. By design these devices resemble small cartridges or cylinders and are provided with small air chambers. These cylinders are so constructed that they can be given an electrostatic charge by applying a direct current potential thereto. When these devices are exposed to either X-rays or gamma rays, the air in the chambers thereof is ionized which causes the electrostatic charge to leak off. The amount of leak-off is proportional to the total quantum of radiation that the air in the chamber of such a device has received. Apparently because of the design of these devices, they have been termed "pocket chambers."

An object of this invention is to provide a pocket chamber that may be made compact and of small dimensions, convenient for wearing by workers exposed to either gamma or X-ray radiation, or both. The particular type of pocket chamber to which this application relates, functions on the principle of a condenser which will take a given potential charge, say, a charge of 150 volts. The pocket chambers are so constructed that they will hold a charge substantially without leakage except when exposed to either X-ray or gamma ray radiation. The leakage of a pocket chamber should not exceed in a 24-hour period more than 1 or 2 volts. When exposed to either gamma ray or X-ray radiation, the air in the chamber which constitutes the dielectric of the condenser is ionized and causes the charge on the condenser to be dissipated or discharged. The amount of discharge is proportional to the total quantity of radiation measured in roentgens to which the air dielectric of the condenser has been exposed. Thus, in use, the pocket chamber is charged with a voltage of say, 150 volts and given to a wearer who wears it on his person, as in his pocket, suspended from his neck on a chain or otherwise. He keeps it on his person at all times while in surroundings where there may be X-ray and/or gamma ray radiation. When such person leaves the region in which he has been exposed, the pocket chamber is given a voltage test to determine to what extent the electrostatic charge on the pocket chamber has been discharged. This test is performed on an electrostatic, preferably quartz fibre type, voltmeter of well known construction. The voltmeter normally is designed to measure a voltage range of about 40 volts. Thus, if the high voltage end of the voltmeter scale is set to 150 volts the low voltage end of the scale will be at about 110 volts. There are two reasons for not using a wider range of voltage: 1) the particular type of voltage-sensitive element that is used in the voltmeter is not uniform in sensitivity at voltages much below 110 volts, therefore its readings would not be accurate if lower voltages were used; 2) unless the voltage on the pocket chamber is above 100 volts the electric field between the plates of its condenser would not be strong enough for very high rates of radiation to separate the positively and the negatively charged particles before they have a chance to recombine. These charged particles are the result of the ionization of some of the air atoms between the plates of the condenser by X or gamma radiation that passes through the chamber. If these charged particles are allowed to recombine the amount of discharge of the pocket chamber will be less than it should have been.

An object of this invention is to provide a pocket chamber that shall be of simple construction, extremely retentive of its initial charge, and accurately dissipate its charge in proportion to the total quantity of radiation to which it is subjected.

It is an object of the invention to provide a pocket chamber of the condenser type in which the internal plate charge collecting electrode is supported in a novel and efficient manner by a single insulator, and in which when the external and internal plates are made of a preselected combination of conducting materials, and the volume of the air chamber within the outer plate, the electrostatic capacity of the condenser, the surface and spacing of the plates are properly proportioned with respect to each other, the voltage charge on the condenser in response to ionization of the air chamber by either X-rays or gamma rays, will be discharged in a manner approaching a linear relationship to the total quantum of radiation in roentgen units received by the air chamber, over a range of quantum of energies from say 50 k. e. v. to 1½ m. e. v.

A further object of the invention is to provide a pocket chamber of the type set forth above in which even though the plates thereof are made of a relatively wide variety of combinations of conducting materials, the voltage discharge will more closely approach linearity with respect to the total quantum of radiation received by the air chamber over a predetermined range of quantum energies than do prior art pocket chambers.

Another object of the invention is to provide a pocket chamber that shall be simple and compact in construction and which may conveniently be made either in the so-called low Roentgen range or in a high Roentgen range. The terms low range and high range as referred to the Roentgen measuring ability of this type of pocket chamber are to be understood as follows: a low range pocket chamber is a unit which requires only a small quantity of X or gamma rays to pass through its ionization chamber in order to show full scale reading on the voltmeter on which it is read. In practice, such pocket chambers are usually designed to require 0.2 roentgen in order to show full scale reading. These are instruments intended for use by laboratory personnel. It has been established that 0.1 roentgen which is a half scale reading of the voltmeter can be absorbed daily by a worker over a period of years with no apparent injury to his person.

A high range pocket chamber is so constructed that it does not show a full scale reading before it has absorbed X or gamma ray dosages of perhaps 10, 100, or even 1000 roentgens. This result is accomplished by decreasing the volume of its ionization chamber or by increasing the capacity of its condenser or both. The former causes fewer ions to be formed in the ionization chamber per unit of radiation dosage. The latter causes the quantity of charge on the condenser of the pocket chamber to be larger for a given applied voltage. Both factors require that a larger total radiation dosage be passed through the ionization chamber in order to effect a given drop in voltage of the condenser of the pocket meter and hence increase the range of the meter in roentgens. Methods for decreasing the volume of the ionization chamber are obvious. The capacity of an air-dielectric condenser may be increased by either increasing the areas of the condenser plates or by bringing the plates closer together, thus decreasing the spacing between plates.

All materials that have been used to date to support the inner mounted plate of the condenser and to insulate it from the hollow plate which surrounds it have been found upon exposure to X or gamma rays to suffer some changes of such a nature that their insulating properties are impaired. These materials include polystyrene which it is proposed to use as the insulating material in this invention. The leakage of charge resulting from this impairment will in general render a high range pocket chamber unacceptable if the insulator is exposed to radiation dosages of 10 roentgens or more.

It is a further object of this invention to provide an insulator and support for the inner electrode of a high range pocket chamber, such as is described above, of such construction that the insulator is substantially free from leakage of charge due to exposure of the insulator of the pocket chamber to dosages of X or gamma rays of several hundred roentgens.

A further object of the invention is to provide a pocket chamber in which the air chamber dielectric shall be substantially dust-proof and particle-free, and from which chamber dust, lint or other particles may be easily removed if for some unaccountable reason they do appear in the chamber.

A still further object of the invention is to provide a low range pocket chamber of the type referred to above, in which one plate of the condenser is hollow, preferably cylindrical in form, and closed at both ends to provide an air chamber of predetermined volume and within which is mounted another plate of the condenser, the plate being supported from a single insulator which insulates the inner plate from the outer plate and maintains the air gap dimensions and volume of the air chamber between the plates constant, even though the device may be subject to abuse, such as shock and jarring.

The foregoing and other objects of the invention will in part be apparent, and will in part, be obvious from the following description taken in conjunction with the accompanying drawings, in which.

Figure 1:
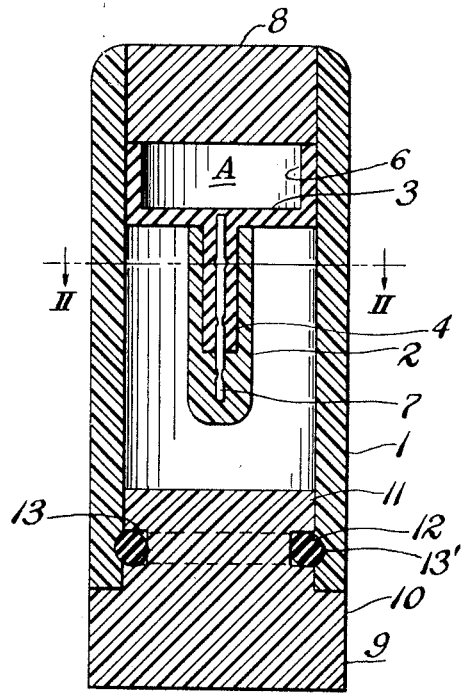
Figure 1 is an enlarged view in longitudinal section of a pocket chamber arranged and constructed in accordance with an embodiment of the invention.
Figure 2:
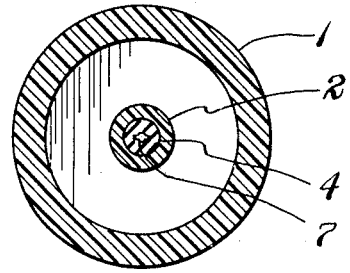
Fig. 2 is a view in section, taken on line II—II of Fig. 1.
Figure 8:
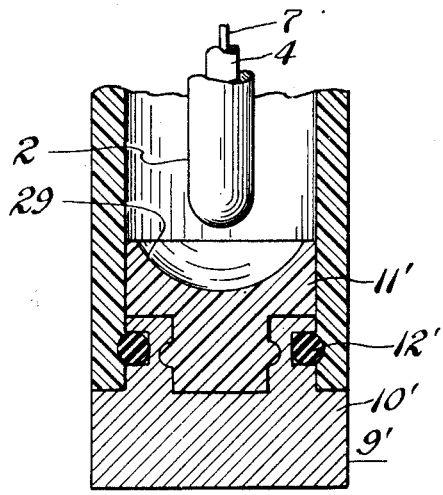
Figure 9:
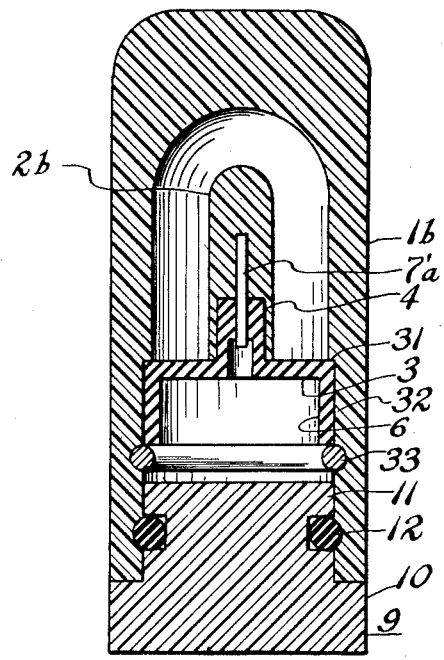
Figure 10:
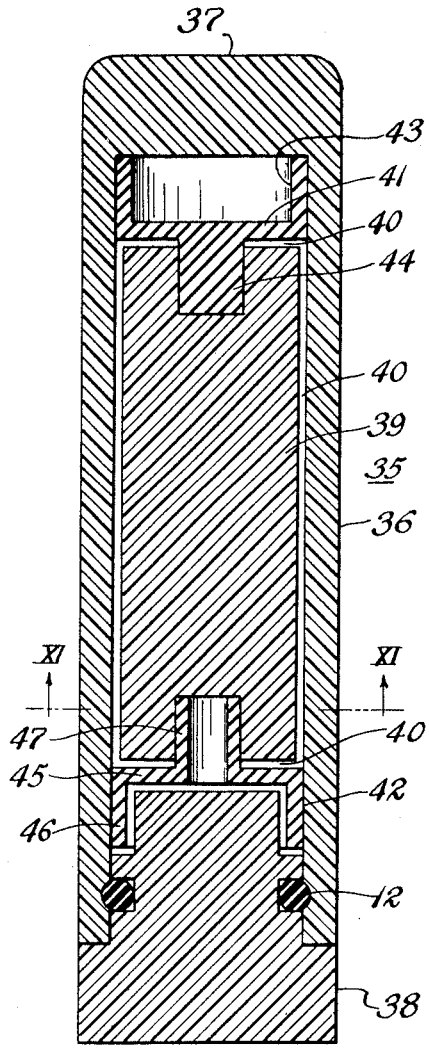
Figure 11:
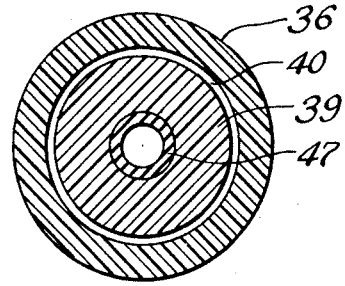

Figs. 4, 5, 6, and 7 are views of still further modified forms of insulator and mounting arrangements for the charge collecting electrode;

Fig. 8 is a view in side elevation of a modified form of dust cap that may be used in the pocket chamber shown in Figs. 1 and 2;

Fig. 9 is a view in longitudinal section of a modified form low-range pocket chamber embodying the invention;

Fig. 10 is a view in longitudinal section of a high-capacity pocket chamber embodying a form of the invention;

Fig. 11 is a view in section taken on line XI—XI of Fig. 10; and

Figure 12:
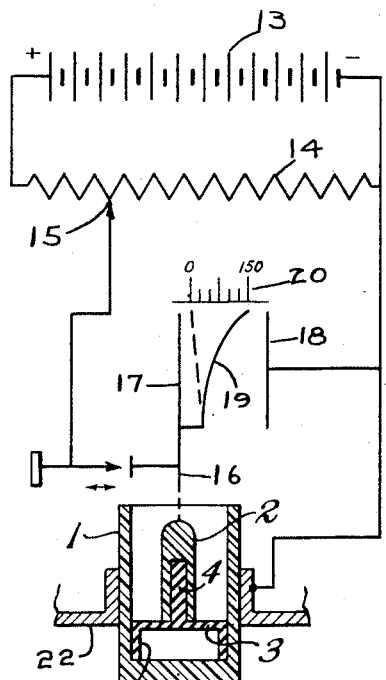

Fig. 12 is a schematic illustration of a charging device and voltmeter whereby the pocket chamber may be initially charged and the residual charge after radiation exposure may be determined.

Throughout the drawings and the specification, like reference characters indicate like parts.

In Figure 1 of the drawings a pocket chamber is shown embodying a form of the invention. Functionally, the pocket chamber as constructed, is an electrostatic condenser of special design. The pocket chamber comprises plates 1 and 2 which are spaced and insulated from each other by an insulator 3. Plate 1 is preferably in the form of a hollow cylinder.

Insulator 3 is substantially disk-like in form, the disk having such a diameter that it will have a tight fit with plate 1. Projecting laterally from the insulator is a cantilever portion 4 upon which plate 2 is mounted, portion 4 being of the same material as that of the insulator. In order to rigidify or stabilize the position of the insulator disk 3, the disk may be provided with an integral rearwardly extending flange 6 whose external diameter is substantially equal to the internal diameter of the plate 1. Disk 3 should be of a material that provides a resistance between plates 1 and 2 of at least $5 \times 10^{19}$ ohms.

As shown, plate 2 is in the form of a cylinder having a recess at one end into which the cantilever portion 4 of the insulator extends.

In order to strengthen the cantilever 4, a metallic reinforcing wire or rod 7 may be imbedded therein. One end of wire or rod 7 is imbedded in the body of the insulator disk 3 and the forward end of the wire or rod projects forwardly of the cantilever into the free end of charge collecting electrode or plate 2.

As shown, the insulator 3 and its bearing flange 6 are disposed inwardly of one end of the cylindrical plate 1 thereby forming a dead air space A between the adjacent end of member 1. Space A is a low volume dead air space to minimize and reduce the number of ions formed in it by X or gamma rays. The open end of the cylinder behind the insulator may be closed by means of an end cap 8. The end cap 8 may be of the same material as plate 1, or it may be of any desired material such as plastics, aluminum, or other metal.

The opposite end of cylindrical plate 1 is provided with a removable cap 9 having a head 10, and a plug portion 11 that projects inwardly of the cylinder and has a neat fit with the internal surface of plate 1. Head 10 abuts the end of the cylindrical member 1 and limits the inward travel of the plug. To render the cap dust-tight so as to prevent dust from entering the air chamber of the condenser, cap 9 may be provided with a resilient seal 12. As shown, seal 12 is in the form of a toroidal ring such as the commonly known O ring. This ring is disposed in an annular groove 13 in plug 10 of the cap. A matching shallow groove 13' is provided internally in cylindrical plate 1 into which the O-ring will expand just as the dust cap 9 comes to a stop against the end of cylindrical plate 1, thus holding the dust cap securely in place.

Cap 9 may be made of the same material as the cylindrical plate 1 or it may be made of metal. I prefer, however, that it be made of the same or similar material as that of which the cylindrical plate 1 is made.

The material of which the condenser plates 1 and 2 are made shall preferably be an "air-wall equivalent" material. Those skilled in the art of ionization chamber design are familiar with the term "air-wall equivalent" and recognize it to mean a material whose average atomic number is equal to the average atomic number of air under standard conditions. The average atomic number of standard air is about 7.15 to 7.2.

The importance of "air-wall equivalent" as applied to the material of which the plates of the condenser of the pocket chamber are made lies in the fact that it is one of the main of a number of conditions which, if fulfilled, insure that the pocket chamber will respond equally to the same dose of X or gamma rays which traverse the air dielectric of its condenser over the entire spectrum of energies of such rays from about 50 k. e. v. of X-rays to the gamma rays from radium.

The term "air-wall effect" as used hereinafter is not necessarily synonymous with the term "air-wall equivalent materials." By "air-wall effect" as applied to my pocket chambers, I have reference to the relationship between discharge of the condenser in volts with respect to the quantum of radiation in Roentgen units that traverses the air chamber dielectric of the pocket chamber over a range of quantum of energies from say 50 k. e. v. to 1½ m. e. v. As this relationship more and more closely approaches linearity it may be said that the pocket chamber has an air-wall response, regardless of whether or not the materials of which the plates of the pocket chamber are composed are "air-wall equivalent." Combinations of materials other than "air-wall equivalent" materials of which the plates of my pocket chamber may be made, will be set forth later herein.

There are many known "air-wall equivalent" materials from which plates 1 and 2 may be made. In fact, there is a formula, well known in the art, which will determine whether or not a given mixture is truly "air-wall." By way of example, an "air-wall equivalent" material may be made from the following components, the proportions being by weight:

| | Parts by weight |
|---|---|
| Pure "Bakelite" resin | 100 |
| Pure graphite | 20 |
| Vanadium oxide | 2 |

In place of the vanadium oxide, I may use cerium oxide or titanium oxide, and the parts by weight employed will be adjusted to compensate for the manner in which their average atomic numbers differ from that of the mixture containing vanadium oxide. These materials are finely powdered, thoroughly and intimately mixed and then molded.

In the above example the materials or compound have been designated as pure. As a practical matter it is not feasible to obtain from commercial suppliers, any of these compounds or materials in a pure state as there are various impurities in them. Because it is sometimes, if not always, impossible to determine what the impurities are beforehand, it can not be predetermined how much they will affect the average atomic number of the molded material made therefrom. It is therefore apparent that having a supply of materials at hand, one must make up a number of moldings, each one having slightly differing amounts of the various component materials and then testing each molding by Bureau of Standards tests to determine which of the compositions are air wall equivalent or substantially so by Bureau of Standards standards. When a composition has been made that adequately meets these standards, the proportions used in that composition are adapted for production schedules.

Insulator 3 may be made of a moldable material, such as polystyrene. Polystyrene has excellent insulating properties and has extremely high specific resistivity, and will provide insulating resistance between plates when the insulator is carefully molded, of at least $5 \times 10^{19}$ ohms.

In the construction of a pocket chamber such as shown in Fig. 1, the wall thickness of the cylindrical plate 1 should not be less than about 1.5 millimeters because it would be too fragile for practical purposes; however, a thickness of about 5 millimeters is ideal from the standpoint of "air-wall" characteristics. The internal diameter of plate 1 may be of the order of ⅜ of an inch.

I prefer that the charge collecting electrode plate 2 be generally cylindrical in form and that its outside diameter be about ⅛ of an inch. Thus, the air space between the charge collecting electrode plate 2 and the inner wall of plate 1 will be about ⅛ of an inch. It also is preferred that the distance between the free end of the electrode plate 2 and the adjacent end of cap plug 11, be about ⅛ of an inch. The length of the air chamber as measured between insulator 3 and the inner end of plug 11 may be about ½ inch.

Any one or all of these dimensions may have to be adjusted in order to secure the proper Roentgen range of the pocket chamber with the voltmeter that is to be used to check it. However, these should be changed, if at all, only to the extent that the previously defined "air-wall effect" for the pocket chamber, is satisfactorily preserved.

The thickness of the insulator disk 3 may be of the order of $\frac{1}{32}$ of an inch to $\frac{1}{64}$ of an inch, and the diameter of the cantilever portion 4 may be of the order of $\frac{3}{32}$ of an inch, or less.

The flange 6 of the insulator should be made no longer than is necessary to provide the support required to adequately center electrode 2 in the air chamber.

The charge collecting electrode 2, preferably molded as an integral piece with the insulator 3 and the cantilever portion 4, may be sprayed or wetted with a polystyrene solvent, following which the molded electrode 2 is slipped over it. The solvent causes the polystyrene to become tacky and be cemented or welded to the charge collecting electrode 2. The assembled electrode and insulator are then placed within the cylinder 1, and a cement or solvent used to cement or weld the flange 6 to the internal surface of plate 1. The end cap 8 is then placed and cemented to the internal surface of cylinder 1.

Before applying dust cap 9 to the open end of cylinder 1, every care should be taken to remove all particles of dust and solid particles that may be loose on the surface of the charged electrode. The pocket chamber is now ready to be charged. To charge the pocket chamber, cylinder 1 is slipped into a socket to which the negative terminal of a battery is connected and the positive electrode of the battery which is coaxial with the shell of the socket is applied to the end of the electrode 2. For a pocket chamber of the design shown in Fig. 1 and having dimensions as above described, a voltage of approximately 150 volts would be applied. When the condenser of the pocket chamber has thus been charged, the end cap 9 is applied and the device is ready for use.

When the device is worn by a person exposed to X-ray or gamma ray radiation these rays penetrate the cylindrical plate 1 and ionize the air in the air chamber of the pocket chamber. As the air is ionized, the air space becomes conductive, thereby causing the charge on the condenser to dissipate or leak off. The extent to which the charge leaks off depends upon the total quantity of radiation to which the air in the air space has been exposed. When the wearer of the device has removed himself from the region of radiation, the total quantity of radiation to which he has been exposed may be determined by slipping the pocket chamber again into the socket of a suitable voltmeter, and reading the residual charge thereon. This is preferably the same voltmeter by means of which the pocket chamber was previously charged. Before inserting the chamber in the socket, the voltmeter is first charged to the same voltage as that to which the pocket chamber had been charged initially and the battery voltage is disconnected from the charging circuit for the voltmeter. For convenience, the scale of the voltmeter is marked, not in volts, but directly in roentgens of X or gamma ray dosage. This is possible because, as previously indicated, the degree of discharge of the pocket chamber in volts is directly proportional to the quantity of radiation in roentgens to which the pocket chamber was exposed. An arrangement by which the pocket chamber may be charged and also by which the residual charge may be measured is shown schematically in Fig. 12.

The apparatus in Fig. 12 includes a charging battery 13 having a resistance 14 connected across the same and a sliding contact 15 for adjusting the charging potential. The arrangement also includes an electrostatic meter 16 having plates 17 and 18 separated by air dielectric. Plate 17 supports a fibre 19 such as quartz adjacent the same. When the meter is charged, the quartz fibre is repelled by plate 17 towards plate 18 and as it is discharged the fibre returns toward plate 17 by its own resilience or elasticity. At zero charge the fibre will be close to plate 17 and when charged with the intended or designed charging voltage it is repelled a given maximum distance from the plate. This range of deflection of the fibre represents the scale deflection and may be read on a scale 20.

When a pocket chamber is to be initially charged, the meter is first charged, the voltage being adjusted by slide contact 15 until the fibre has deflected to the 150 volt position. While the battery voltage is still connected to the meter, the pocket chamber is connected to the battery, the outer chamber 1 being placed in a terminal clip 22 and the charging electrode 2 connected to the meter 16. Thus the pocket chamber is given a known voltage charge.

After the pocket chamber has been charged it is ready to be worn by the person who may be exposed more or less to X or gamma ray radiation. To determine the quantum of radiation received by such person, the pocket chamber is connected across the terminals of the meter, in parallel therewith, the meter, however, having first been charged to 150 volts. If the pocket chamber has been exposed to radiation, its voltage charge will be less than what was initially. Because of the parallel connection of meter and pocket chamber, fibre 17 will deflect to a voltage position corresponding approximately to one-half the amount that the pocket chamber has been discharged. It will deflect to exactly one-half the amount that the pocket chamber has been discharged if the capacity of the pocket chamber is exactly equal to the capacity of the meter 16. This may be true in the case of low range pocket chambers. Then, if the meter fibre deflects to a position corresponding to 130 volts, it will be apparent that the voltage on the pocket chamber had been decreased 40 volts. By calibration, it will then be known that the pocket chamber had received a known total quantity of radiation expressed in fractions or decimals of a roentgen—for example, 0.1 roentgen more or less, depending on the position the fibre takes and this a function of the residual charge.

Figure 3:
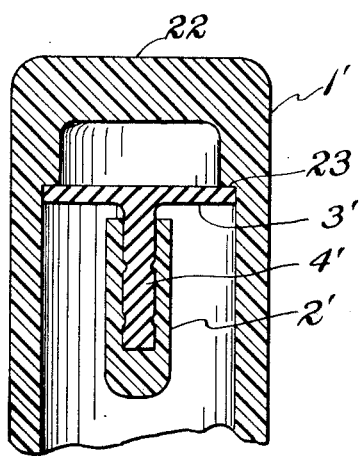
Fig. 3 is a partial view in section of one end of the pocket chamber illustrating a modified form of insulator for supporting the charge collecting electrode or plate in the pocket chamber.

In Fig. 3 a modified form of the insulator and the cylindrical external plate are shown. As there illustrated, one end of the cylinder or plate 1' is closed as at 22 in the molding thereof. In other words, the end cap 22 is integral and unitary with the cylindrical wall of the cylinder. The mounting insulator 3' comprises a thin circular disk that rests against an annular shoulder 23 near the closed end of cylinder 1. Shoulder 23 holds the insulator 3' in its proper position. The insulator disk as shown, is provided with an integral cantilever portion 4', the reinforcing wire 7 and the centering flange 6 being omitted. The charge collecting electrode 2' is mounted over the cantilever portion 4' with the rear end thereof spaced from disk 3'.

Figure 7:
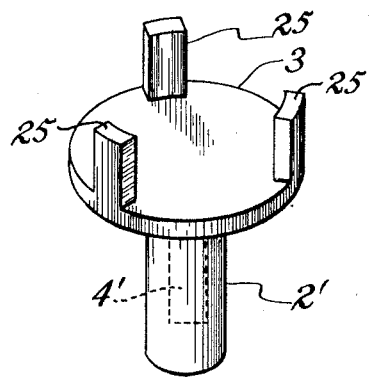

Instead of mounting the insulator disk as shown in Fig. 3, I may omit the annular shoulder 24 and provide the insulator disk with a plurality of lugs or legs 25 that project rearwardly thereof and are spaced, for example, to form a tripod, as shown in Fig. 7. This tripod serves to space the insulator disk from the closed end of cylinder 1' and at the same time hold it in a position where the disk is at right angles to the longitudinal axis of the cylinder.

An advantage of the disk type of insulator when combined with the cantilever support for plate 2 that is here provided, is that absorption of electric charge from plate 2 into its supporting member or cantilever 4, is greatly reduced. This is because cantilever 4, and particularly its surface, makes internal contact with plate 2. According to well known laws of electrostatics, since plate 2 is a conductor, cantilever 4 has no electric field whatever acting on it. Absorption of charge from plate 2 into its supporting member will therefore not take place. Such absorption has always been one of the major problems in the design of this type of instrument.

Another advantage lies in the fact that the leakage path of insulator 3 is longer when the cantilever mounting is used than with the conventional insulator in which a supporting collar of insulator of considerable bulk surrounds the plate 2 and lies directly between plates 1 and 2. In addition, the insulator 3 as shown in Figures 1, 3, 9 and 10, lies in a region in which the electric field is weaker along the path of insulator leakage than has been the case in previous designs. Not only is the electric field inherently weaker in this region but it is largely directed crosswise of the insulating path. Where the effective electric field is weak, leakage of the insulator will be correspondingly small, no matter what the specific cause of the leakage.

A third advantage of the particular method of supporting the plate 2 as disclosed herein, is that the plate is so short and rigid that only one insulator need be used. It has been conventional to use one insulator at each end of the collecting electrode which corresponds to plate 2. Other things being equal one insulator will cause just half the leakage of two insulators. Inherent in the single insulator type of mounting also is simplicity, ease of assembly and low cost.

Figure 4:
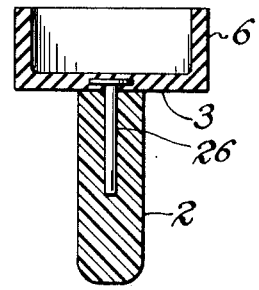

In Fig. 4 the charge collecting electrode 2 is supported on a metallic pin 26, the inner end of which is molded in the center of the insulator disk 3. The projecting or cantilever portion 4 extends into the charge collecting electrode and may be cemented, driven, or screwed into it.

Figure 6:
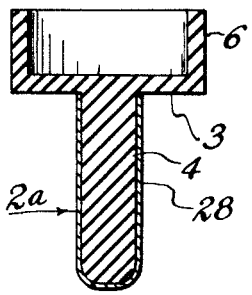

In Fig. 6 is shown a form of charge collecting electrode 2a and insulator 3 in which the collecting electrode is formed by covering the surface of cantilever 4 with a conducting layer 28 of graphite by a method which is well known and has previously been described in the literature. Members 3 and 4 may also be formed separately and then solvent welded together after the conducting coating has been applied to cantilever 4. Electrode 2a may not exhibit the air wall effect to quite the same degree that can be secured with, for example, plate 2 of Figure 1, but is quite acceptable measured by present standards of performance.

Figure 5:
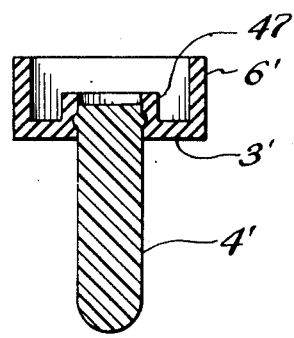

Figure 5 is a modification of the charge collecting electrode which is shown in Fig. 6. The entire cantilever 4' in this case is of substantially air wall equivalent material and forms the collecting electrode. This is molded at one end into a central aperture in the insulator 3'. A flange 47 projecting rearwardly of the insulator forms an insulating protecting wall or shroud for the anchored end of electrode 4'.

In Fig. 8 I have shown a modified form of dust cap 9' that can be used with either of the pocket chambers shown in Figs. 1 and 3. The cap as shown has a plug 11' of substantially air-wall equivalent material secured to the inner end of the cap and the surface 29 adjacent the end of electrode 2 is made concave so as to provide a constant length of gap between rounded end of electrode 2' and the plug 11'. Alternately the entire cap may be of substantially air-wall equivalent material but otherwise as in Fig. 8.

The pocket chamber shown in Fig. 9 differs from the others in that the charge collecting electrode 2b is sealed into the ionization chamber. As shown the insulator 3 and electrode 2b are inserted into the chamber of plate 1b from the open end thereof so that when placed, electrode 2b projects into the ionization chamber and is supported and sealed therein by the insulator 3. As shown, the insulator is located by an annular shoulder 31 and the flange 6 thereof is cemented to the outer plate as at 32. If desired, the electrode and insulator may be locked in place and sealed by means of a resilient lock ring 33. The reinforcing wire 7'a extends into the well which passes through the center of the insulator disk so that the pocket chamber electrode 2b may be charged by connecting the exposed end of the wire to a battery terminal. The charging wire 7'a and the insulating walls of the well may be protected by means of a dust cap 9 similar to the one shown in Fig. 1. As shown, the wall of the pocket chamber adjacent the end of the electrode may be made concave so as to be concentric with the curved end of the electrode. A uniform spacing between the charging electrode and the inner wall of plate 1 is thus provided. The form of pocket chamber shown in Fig. 9 has the advantage that dust can not enter the pocket chamber to impair its accuracy after assembly thereof.

As stated previously herein, the plates of the pocket chamber described in Figs. 1 to 9 inclusive, need not be made of "air-wall equivalent materials" so long as the materials employed produce the desired end result i. e. a voltage discharge of the condenser that sufficiently and accurately reflects the total quantity of radiation received by the air chamber between the internal charge collecting electrode and the inner wall surface of the external plate. These plates may be made of combinations of materials that will give a substantially air-wall effect, for example, as follows:

*Combination I*

Parts by weight

External plate:
Phenolic resin _____ 100
Graphite _____ 20
Vanadium oxide _____ 2

Internal plate (relatively large diameter)—same as external plate.

*Combination J*

Parts by weight

External plate:
Phenolic resin _____ 100
Graphite _____ 20

Internal plate (of relatively small diameter)—aluminum wire coated with a colloidal suspension of graphite in water.

Combination K

External plate—phenolic resin, such as "Bakelite" having a coating of a colloidal suspension of graphite in water on the inside surface thereof.
Internal plate (of small diameter)—aluminum wire uncoated.

In Fig. 10 of the drawing is illustrated a high Roentgen range pocket chamber 35 having a high electrostatic capacity as a condenser and an ionization chamber of low volume. Its capacity is much higher than capacities of the pocket chambers of Figs. 1, 3, 8 and 9, but the volume of the ionization chamber, that is the volume of the air space separating the inner and outer plates thereof, is much smaller. It can be shown by calculation, that the distance between the inner electrode plate and the outer plate can be as short as 0.005 inch without arcing when the pocket chamber is charged to a voltage of 150 volts. If the condenser plate 39 were made one inch in length this would give a condenser capacity of about 54 micro-micro farads and an ionization chamber volume of 0.1 cubic centimeter. The resultant full scale range of the high range pocket chamber should be approximately 160 roentgens. The above numerical values are by way of illustration and are not intended to indicate a definite maximum Roentgen range.

The high range pocket chamber 35 comprises a hollow cylindrical member 36 having an integral cap or closure 37 at one end and a removable plug or closure 38 at the other. Member 36 and the integral closure 37 are made of substantially "air-wall equivalent" materials. Within the hollow member 36 is mounted a charge collecting electrode 39 preferably solid and cylindrical in form and made of "air-wall equivalent" material. The shape and size of charge collecting electrode 39 are such as to provide a concentric air space or gap 40 of sufficient length to prevent arcing or corona discharge of the condenser. This space must be dust and particle free. The charging electrode is supported at its opposite ends on insulator disks 41 and 42, whose diameters are substantially equal to the inside diameter of the hollow member 36. The charge collecting electrode 39 being spaced and insulated from the inner surface of member 36 as shown, members 36 and 39 form the plates of an electrostatic condenser. By applying an electric potential to members 36 and 39 the pocket chamber is charged.

The supporting insulator disk 41 is provided with a centering sleeve or flange 43 on its rear face and with a supporting plug or cantilever 44 projecting from the front face thereof into the adjacent end of electrode or plate 39. The primary function of the centering sleeve or flange 43 is to space the insulating disk from the end cap 37 of the "air-wall equivalent" member 36 and to locate and center the cantilever portion 44 with respect to the longitudinal axis of the hollow member 36.

The insulator 42 comprises a disk 45 of insulating material having a centering flange 46 projecting outwardly therefrom and a hollow or apertured cantilever plug 47 that extends into the charging end of the electrode 39. Plug 47 is apertured or made hollow as shown, in order that a charging terminal may be inserted through the same into engagement with the charge collecting electrode 39 when the high range pocket chamber is to be charged.

The dimensions of a high range pocket chamber such as shown in Fig. 10, may be as follows, it being understood, however, that such dimensions are by way of example, and are not intended as limitations:

| | |
|---|---|
| Length of charging electrode 39 | ½ inch to 1 inch. |
| Length of air gap between longitudinal walls of plate 36 and charging electrode 39 | 0.005″ to .050″. |
| Length of air gap between ends of charging electrode 39 and adjacent faces of insulator disks 41 and 45 | About 0.015″. |
| Outside diameter of charging electrode 39 | 0.125″ to 0.370″. |
| Inside diameter of member 36 | 0.13″ to 0.375″. |
| Wall thickness of member 36 | 1.5 millimeters to 5 mm. |
| Thickness of insulator disks 41 and 45 | 1/32″ to 1/64″. |

The insulators 41 and 42, their centering flanges and the cantilevers thereof may be made of polystyrene or other suitable material. The insulators may be secured to the charging electrode by wetting the surfaces of the cantilevers with a solvent and inserting the cantilevers into the recesses in the ends of the electrode 39. The solvent renders the polystyrene tacky so that the cantilevers are cemented to the electrode when the polystyrene sets.

To assemble the high range pocket chamber the charge collecting electrode 39 is inserted through the open end of member 36 until the sleeve of the insulator 41 abuts the end wall 37. A polystyrene solvent is then applied at the junction between plate 36 and flange 46. When the tacky surface sets, the internal electrode 39 is held in its proper position.

From the foregoing it will be apparent that both the low and the high range pocket chambers embodying the invention are of simple, compact construction, that the form and construction of the insulators thereof reduces the possibility of absorption and leakage of charge to a minimum and that the charge impressed on them will be dissipated substantially in linear proportion to the total quantity of either X or gamma rays received by the ionization chambers thereof.

Having thus described the invention it will be apparent to those skilled in this art that modifications in the pocket chambers may be made without departing from either the spirit or the scope of the invention.

Therefore, what I claim as new and desire to secure by Letters Patent is:

1. A gamma and X-ray responsive pocket chamber comprising a condenser having a hollow cylindrical plate, an insulator disk disposed within and at right angles to the longitudinal axis of the cylindrical plate, said insulator being attached at its peripheral edge to the interior wall of said cylindrical plate, a cylindrical charge collecting electrode plate disposed within said hollow cylindrical plate, the hollow plate and the charge collecting electrode plate being composed of substantially air-wall equivalent material, means extending into one end of said charge-collecting electrode and secured to the central portion of said insulator in coaxial relationship with the longitudinal axis of said hollow plate for securing said charge-collecting electrode to said disk in coaxial relation to said plate, and means for closing the ends of said hollow plate, the insulator disk being of a material that provides a resistance of at least $5 \times 10^{19}$ ohms between said condenser plates.

2. A gamma and X-ray responsive pocket chamber comprising a condenser having a hollow cylindrical plate, a cylindrical plate disposed within said hollow plate in coaxial spaced relation thereto, said plates being of substantially air-wall equivalent material, a cylindrical insulator within said hollow plate having its cylindrical surface in engagement with the inner wall of the hollow plate, said insulator being of a material having an effective resistance between said plates of at least $5 \times 10^{19}$ ohms, said insulator having a portion projecting therefrom in coaxial relation to said hollow plate, said inner plate having a recess in one end thereof extending coaxially of and into the body thereof for accommodating said projecting portion of the insulator and supporting the same within said hollow plate, and a removable cap for closing the end of said hollow plate opposite said insulator, whereby a closed air chamber is formed within said hollow plate, said air when the condenser is charged, being ionizable in response to gamma and X-ray exposure whereby the charge on said plates is discharged in proportion to the total quantum of radiation that the air in said chamber has received.

3. A low Roentgen capacity pocket chamber comprising a hollow member closed at one end and having a removable dust cap closing the opposite end, a disk of insulating material disposed within said hollow member at right angles to the longitudinal axis thereof and adjacent one end thereof, said insulator disk having a cantilever secured to its central portion and extending therefrom coaxially with the longitudinal axis of said hollow member, a charge collecting electrode supported by said cantilever, the insulator disk being of a material providing an effective resistance between said electrode and hollow member of at least $5 \times 10^{19}$ ohms, the cantilever extending into one end of the charge collecting electrode and being secured thereto, the longitudinal surface of said charge collecting electrode being equidistant from the internal longitudinal surface of the hollow member, said hollow member and the charge collecting electrode being of substantially air-wall equivalent materials.

4. A pocket chamber according to claim 3 characterized by the fact that the insulator disk is provided with a cylindrical flange adapted to be secured to the inner wall of said hollow member and that the cantilever projects from said disk in a direction opposite that in which said flange projects.

5. A pocket chamber according to claim 3 characterized by the fact that the cantilever and disk are unitary and consist of polystyrene material.

6. A pocket chamber according to claim 3 characterized by the fact that the insulator disk is molded and composed of a moldable plastic material providing an effective resistance of at least $5 \times 10^{19}$ ohms between the charge collecting electrode and the hollow member.

7. An X-ray and gamma ray responsive pocket chamber according to claim 3 characterized by the fact that one end of the hollow member is closed by a cap that is unitary with and of the same material as the hollow member, that the insulator disk is disposed within the hollow member a predetermined distance from said closed end, that the cantilever and charge collecting electrode project into the space between said disk and said closed end, that the disk is sealed to the inner wall of said hollow member, whereby the charge collecting electrode is confined within a sealed air chamber, and that the disk is apertured at its center to render the charge collecting electrode accessible to an electrically charged charging terminal, and that the open end of said hollow member is provided with a removable sealed dust cap having a plug extending into said hollow member.

8. A gamma and X-ray responsive pocket chamber according to claim 1 characterized by the fact that the insulator disk is provided with a central aperture and a unitary rearwardly projecting cylindrical flange concentric with said aperture and that one end of said charge collecting electrode extends through said aperture and within the hollow of said flange, the projecting end of said electrode being anchored to the walls of the aperture and said flange.

9. A gamma and X-ray responsive pocket chamber according to claim 1 characterized by the fact that one end of said hollow cylindrical plate is closed by a cap that is unitary with and of the same material as the hollow plate, that the insulator disk is disposed adjacent the opposite end of said hollow cylindrical plate and attached at its peripheral edge to the inner wall of the hollow plate, and that the charge collecting electrode projects from the central portion of said disk towards the cap of said hollow plate, and that the disk is apertured at its central portion whereby contact may be made between said charge collecting electrode and the charging terminal of a battery.

10. A gamma and X-ray responsive pocket chamber according to claim 1 characterized by the fact that the insulator is molded and composed of polystyrene.

11. A gamma and X-ray responsive pocket chamber according to claim 1 characterized by the fact that the insulator disk has a cantilever projecting at right angles from the central portion of one face thereof, that the cantilever and disk are unitary and that the surface of the cantilever is encased in a layer of a mixture of flake graphite and electrically conducting metal particles, the layer being bonded to the surface of the cantilever.

12. A high Roentgen range high capacity gamma and X-ray responsive pocket chamber comprising a condenser having a hollow cylindrical plate, a cylindrical plate disposed within the hollow plate, said inner plate having sockets in the ends thereof, a supporting insulator disk within said hollow plate adjacent the ends of said inner plate, said disks being secured at their peripheral edges to the inner wall of said hollow plate, each of said disks having a cantilever projecting from the central portion thereof into the adjacent socket of said inner plate and holding the inner plate in a position such that its longitudinal axis is coaxial with the longitudinal axis of the outer plate and that the inner cylindrical surface of said outer plate is substantially concentric with the outer cylindrical surface of the inner plate, the inner and outer plates being composed of substantially air wall equivalent material and the material of the insulators being such that the insulators provide resistance between plates of at least 5 × 10¹⁹ ohms, the air gap space between the cylindrical surfaces of the inner and outer plates being within the range of about 0.005 to about 0.105 inch, and end plugs for closing the ends of said outer cylinder, one of said insulators being provided with a central aperture whereby the inner plate may be connected to a charged charging electrode.

13. A pocket chamber according to claim 12 characterized by the fact that the plug adjacent the apertured insulator disk is removable and that the cap at the opposite end of said outer plate is integral therewith.

14. A pocket chamber according to claim 12 characterized by the fact that the air gap between the ends of said inner plate and the adjacent faces of said insulators is about 0.015 inch, that the air gap between the cylindrical surfaces of said outer and inner plates is within the range of about 0.005 to 0.05 inch and that the length of space between said insulators is not less than about ½ inch.

15. A gamma and X-ray responsive pocket chamber comprising a condenser having a hollow cylindrical plate, a cylindrical plate disposed within said hollow plate in coaxial spaced relation thereto, said condenser plates being composed of a combination of such materials that when the air dielectric of said condenser is exposed to X-rays or gamma rays, while the condenser is charged, that a substantially air-wall effect is produced thereby, a cylindrical insulator within said hollow plate having its cylindrical surface in engagement with the inner wall of the hollow plate, said insulator being of a material having an effective resistance between said plates of at least 5 × 10¹⁹ ohms, said insulator having a portion projecting therefrom in coaxial relation to said hollow plate, said inner plate having a recess in one end thereof extending coaxially of and into the body thereof for accommodating said projecting portion of the insulator and supporting the same within said hollow plate, and a removable cap for closing the end of said hollow plate opposite said insulator, whereby a closed air chamber is formed within said hollow plate, said air when the condenser is charged, being ionizable in response to gamma and X-ray exposure whereby the charge on said plates is discharged in proportion to the total quantum of radiation that the air in said chamber has received.

16. A gamma and X-ray responsive pocket chamber comprising a condenser having a hollow cylindrical plate, an insulator disk disposed within and at right angles to the longitudinal axis of the cylindrical plate, said insulator being attached at its peripheral edge to the interior wall of said cylindrical plate, a cylindrical charge collecting electrode plate disposed within said hollow cylindrical plate, said condenser plates being composed of a combination of such materials that when the air dielectric of said condenser is exposed to X-rays or gamma rays, while the condenser is charged, a substantially air-wall effect is produced thereby, means for supporting said electrode plate at one end thereof from the central portion of said insulator in coaxial relationship with the longitudinal axis of said hollow plate, and means for closing the ends of said hollow plate, the insulator disk being of a material having such resistance that the insulating resistance provided between the plates of said condenser by said disk is at least 5 × 10¹⁹ ohms.

OLE G. LANDSVERK.

References Cited in the file of this patent

UNITED STATES PATENTS

| Number | Name | Date |
|---|---|---|
| 2,536,991 | Wollan et al. | Jan. 2, 1951 |
| 2,545,386 | Rich | Mar. 13, 1951 |

OTHER REFERENCES

Atomic Energy Commission Document, MDDC, 886, Jan. 17, 1947, 4 pages.

Atomic Energy Commission Document, MDDC, 395, Dec. 13, 1945, 8 pages.